(12) United States Patent
Lee et al.

(10) Patent No.: US 9,821,500 B2
(45) Date of Patent: Nov. 21, 2017

(54) METHOD OF MANUFACTURING HYBRID SCAFFOLD AND HYBRID SCAFFOLD MANUFACTURED BY THE SAME

(71) Applicant: KOREA INSTITUTE OF MACHINERY & MATERIALS, Daejeon (KR)

(72) Inventors: Junhee Lee, Daejeon (KR); Sua Park, Daejeon (KR); Wan-Doo Kim, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 261 days.

(21) Appl. No.: 14/590,052

(22) Filed: Jan. 6, 2015

(65) Prior Publication Data

US 2015/0230912 A1   Aug. 20, 2015

(30) Foreign Application Priority Data

Feb. 18, 2014   (KR) .................. 10-2014-0018222

(51) Int. Cl.
| | | |
|---|---|---|
| *B29C 47/00* | (2006.01) | |
| *B29C 67/00* | (2017.01) | |
| *B29C 47/56* | (2006.01) | |
| *B29C 47/54* | (2006.01) | |
| *B29C 47/92* | (2006.01) | |

(Continued)

(52) U.S. Cl.
CPC ........ *B29C 47/0004* (2013.01); *B29C 47/043* (2013.01); *B29C 47/54* (2013.01); *B29C 47/56* (2013.01); *B29C 47/92* (2013.01); *B29C 67/0055* (2013.01); *B33Y 10/00* (2014.12); *B33Y 80/00* (2014.12); *B29C 2947/9258* (2013.01); *B29C 2947/92514* (2013.01); *B29C 2947/92704* (2013.01); *B29C 2947/92904* (2013.01); *B29K 2995/006* (2013.01); *B29L 2009/00* (2013.01)

(58) Field of Classification Search
CPC .. B29C 2947/92514; B29C 2947/9258; B29C 2947/92704; B29C 2947/92904; B29C 47/0004; B29C 47/043; B29C 47/54; B29C 47/56; B29C 47/92; B29C 67/0055; B29K 2995/006; B29L 2009/00; B33Y 10/00

See application file for complete search history.

(56) References Cited

U.S. PATENT DOCUMENTS

2012/0089238 A1*  4/2012  Kang .................... C12M 33/00
                                                         623/23.72

FOREIGN PATENT DOCUMENTS

KR   2011-0025327 A   3/2011

OTHER PUBLICATIONS

Khalil et al., "Multi-nozzle deposition for construction of 3D biopolymer tissue scaffolds," Rapid Prototyping Journal, vol. 11, No. 1, (2005) pp. 9-17.*

* cited by examiner

*Primary Examiner* — Aradhana Sasan
(74) *Attorney, Agent, or Firm* — Hauptman Ham, LLP

(57) ABSTRACT

In an apparatus for manufacturing a hybrid scaffold, a first strand having bin compatible polymer and a second strand having a mixture of bio compatible material and cells alternate with each other. Thus, mechanical strength of the hybrid scaffold is improved, and the cells uniformly grow among entire region of the scaffold. Furthermore, diameters of the first and second strands and interval between the first (Continued)

and second strands are precisely controlled. Thus, the hybrid scaffold is precisely manufactured according to a scaffold design.

7 Claims, 11 Drawing Sheets

(51) Int. Cl.
*B29C 47/04* (2006.01)
*B33Y 80/00* (2015.01)
*B33Y 10/00* (2015.01)
*B29L 9/00* (2006.01)

(a)

(b)

(c)

METHOD OF MANUFACTURING HYBRID SCAFFOLD AND HYBRID SCAFFOLD MANUFACTURED BY THE SAME

PRIORITY STATEMENT

This application claims priority under 35 U.S.C. §119 to Korean Patent Application No. 10-2014-0018222, filed on Feb. 18, 2014 in the Korean Intellectual Property Office (KIPO), the contents of which application are herein incorporated by reference in their entirety.

BACKGROUND

1. Field of Disclosure

The present disclosure of invention relates to a method of manufacturing a hybrid scaffold and the hybrid scaffold manufactured by the same. More particularly, the present disclosure of invention relates to a method of manufacturing a hybrid scaffold and the hybrid scaffold manufactured by the same. In the method of manufacturing the hybrid scaffold, a first strand having bio compatible polymer and a second strand having a mixture of bio compatible material and cells alternate with each other. Thus, mechanical strength of the hybrid scaffold is improved, and the cells may uniformly grow among entire region of the scaffold. Also, an interval between the first and second strands may be precisely controlled so that the hybrid scaffold may be precisely manufactured according to a scaffold design.

2. Description of Related Technology

Tissue engineering is technologies for manufacturing a substitute of a tissue to transplant the substitute into a living body based on basic concepts and technologies of bioscience, medical science and engineering, thereby maintaining, improving and recovering body function. In 1980's, artificial skin was firstly invented so that the tissue engineering was recognized as one of new studies. The tissue engineering has actively studied in various fields until recently. When a structure of the tissue is very complex, the study for the complex tissue is in an early stage. However, when a structure of the tissue such as skin, bone, etc., is simple, the substitute has been improved to be widely used.

In order to realize the tissue engineering, a portion of tissue is extracted from a body of a patient. Cells are separated from the extracted tissue. The separated cells are cultivated to a required amount, thereby forming a scaffold that supports the cultivated cells. The scaffold is transplanted into the body.

In most tissues and organs, the transplanted cells receive oxygen and nutrition by diffusion of body fluid until new blood vessel is formed. After the blood vessel is formed, the cells multiply and differentiate to form new tissue and organ, and the scaffold that is biolytic is dissolved, thereby disappearing.

Related art for the scaffold is Korean patent laid open publication number 2011-0025327 (entitled "Double Layered Scaffold for Cultivating Bone Cell and Cartilage Bone Cell" on Mar. 10, 2011).

The scaffold has various shapes for various portions of the body.

Applicable field is changed by size of pores formed by thickness of a strand that is formed by dispensing and an interval between adjacent strands. In order to manufacture the scaffold having right size of pores, control of dispensing condition and environment of the bio compatible material is important.

However, manufacturing the scaffold of a precise design satisfying the above-mentioned conditions is very difficult. Thus, the shapes of the manufactured scaffold are restricted.

SUMMARY

The present invention is developed to solve the above-mentioned problems of the related arts. The present invention provides a method of manufacturing a hybrid scaffold and the hybrid scaffold manufactured by the same. In the method of manufacturing the hybrid scaffold, a first strand having bio compatible polymer and a second strand having a mixture of bio compatible material and cells alternate with each other. Thus, mechanical strength of the hybrid scaffold is improved, and the cells may uniformly grow among entire region of the scaffold.

That is, when a scaffold only include bio compatible polymer, cells may be seeded after the scaffold is completed so that the cells may not uniformly distributed along an entire inside of the scaffold. Thus, the cells may not be uniformly cultivated. Also, a scaffold manufactured by mixing bio compatible material and cells may have weak mechanical strength, so that the scaffold may be deformed during manufacturing or may be quickly biodegradable. However, the present invention provides a method of manufacturing a hybrid scaffold and the hybrid scaffold manufactured by the same, which solve the above-mentioned problems.

The present invention also provides a method of manufacturing a hybrid scaffold and the hybrid scaffold manufactured by the same. In the method of manufacturing the hybrid scaffold and the hybrid scaffold manufactured by the same, an interval between the first and second strands may be precisely controlled so that the hybrid scaffold may be precisely manufactured according to a scaffold design.

According to an exemplary embodiment, an apparatus for manufacturing a hybrid scaffold using an apparatus includes a first dispensing head, a second dispensing head and a collecting member. The first dispensing head includes a first nozzle part dispensing bio material supplied from a first material storing part, a second dispensing head including a second nozzle part dispensing bio material supplied from a second material storing part. The collecting member is disposed under the first and second dispensing heads. The method includes a) preparing by storing bio compatible polymer in the first material storing part and mixture of bio compatible material and cells in the second material storing part; b) firstly dispensing by controlling position of the first dispensing head using a dispensing position controller to dispense liquefied or melted bio compatible polymer on the collecting member, thereby forming a first strand, the dispensing position controller controlling position of the first and second dispensing heads; c) secondly dispensing by controlling the position of the second dispensing head using the dispensing position controller to dispense the mixture of the bio compatible material and the cells on the collecting member, thereby forming a second strand; and d) forming the hybrid scaffold by alternately disposing the first and second strands.

In an embodiment, printing pressure and printing speed of the first and second dispensing heads and diameters of the first and second nozzle parts may be controlled based on size of pores in the hybrid scaffold and diameter of each strand.

In an embodiment, the preparing may further include selecting the diameters of the first and second nozzle parts based on the condition of the hybrid scaffold to mount the first and second nozzle parts on the first and second dispensing heads, respectively.

In an embodiment, the firstly dispensing may further include dispensing the bio compatible polymer to be printed at the printing speed of about 30 mm/min to about 600 mm/min and the printing pressure of about 10 kPa to about 1,000 kPa.

In an embodiment, the secondly dispensing may further include dispensing the mixture of the bio compatible material and the cells to be printed at the printing speed of about 30 mm/min to about 300 mm/min and the printing pressure of about 10 kPa to about 400 kPa.

In an embodiment, the second dispensing head may include a second piston pressing the bio material stored in the second material storing part; an external housing including an inlet and an outlet, the bio material stored in the second material storing part inflowing through the inlet; a screw part rotationally mounted in the external housing; and a second nozzle part connected to the outlet, the bio material being dispensed through the second nozzle part. The material may flow out through the outlet. The screw part may include a screw connected between the inlet and the outlet. Rotational frequency of the screw part, through which the mixture of the bio compatible material and the cells is dispensed on the collecting member in the secondly dispensing, may be about 1 rpm to about 100 rpm.

In an embodiment, the first dispensing head may include a first piston and a first heating part. The first piston may press the bio material stored in the first material storing part so that the bio material is dispensed through the first nozzle part. The first heating part may include a heating coil around an external surface of the first material storing part to liquefy or melt the bio compatible polymer stored in the first material storing part. The liquefied bio compatible polymer may be dispensed through first nozzle part.

In an embodiment, the second material storing part of the second dispensing head may include a plurality of material storages.

In an embodiment, the second material storing part may include a 2-1 material storage, and a 2-2 material storage including solidifying agent or liquid having cells different from the 2-1 material storage.

In an embodiment, the second material storing part may further include a 2-3 material storage including solidifying agent or liquid having cells different from the 2-1 material storage or 2-2 material storage.

According to an exemplary embodiment, a hybrid scaffold is manufactured by the above-mentioned method. In an embodiment, the hybrid scaffold may be formed by alternating the first and second strands by a constant interval, and may include a plurality of pores uniformly distributed between the first and second strands.

In an embodiment, the hybrid scaffold may be formed by alternating the first and second strands. A portion of the first and second strands may make contact with each other in a width direction and another portion of the first and second strands may be spaced apart from each other.

In an embodiment, the pore between the first and second strands may have a size of about 10 μm to about 500 μm.

In an embodiment, the hybrid scaffold may be formed by alternating the first and second strands without a pore to form a film shape.

In an embodiment, the diameter of the first strand (bio compatible polymer strand) may be about 10 μm to about 1,000 μm, and the diameter of the second strand (bio compatible materials and cells) may be about 100 μm to about 2,000 μm.

In an embodiment, the hybrid scaffold may include a plurality of layers stacked together, and different cells are printed in different layers.

In an embodiment, different cells may be printed in same layer of the hybrid scaffold.

According to the method of manufacturing the hybrid scaffold and the hybrid scaffold manufactured by the same, a first strand having bio compatible polymer and a second strand having a mixture of bio compatible material (hydrogel) and cells alternate with each other. Thus, mechanical strength of the hybrid scaffold is improved, and the cells may uniformly grow among entire region of the scaffold.

That is, in order to solve the problem of low mechanical strength of hydrogel that is bio compatible material, the first strand having the bio compatible polymer that has high mechanical strength and the second strand alternate, thereby increasing the mechanical strength of the scaffold.

Also, when a scaffold includes only bio compatible polymer, cells may be seed on the scaffold after the entire scaffold is fabricated. However, the hybrid scaffold of the present includes the cells inside thereof, so that the cells may be uniformly seeded over the entire of the scaffold. In addition, different cells may be cultivated over different layers of the hybrid scaffold.

Furthermore, diameters of the first and second strands and interval between the first and second strands may be precisely controlled. Thus, the hybrid scaffold may be precisely manufactured according to a scaffold design.

That is, the bio compatible polymer and the bio compatible material (hydrogel) having different strengths are dispensed at optimized conditions of printing speed and pressure, so that size of pore in the hybrid scaffold may be controlled. Also, the hybrid scaffold may be manufactured without a pore. Thus, the hybrid scaffold may be manufactured at various designs. Also, quality of the manufactured scaffold such as accuracy, preciseness, etc., may be greatly improved.

BRIEF DESCRIPTION OF THE DRAWINGS

The above and other features and advantages will become more apparent by describing exemplary embodiments thereof with reference to the accompanying drawings, in which.

DETAILED DESCRIPTION

Hereinafter, exemplary embodiment of the invention will be explained in detail with reference to the accompanying drawings.

Example 1

Figure 2:
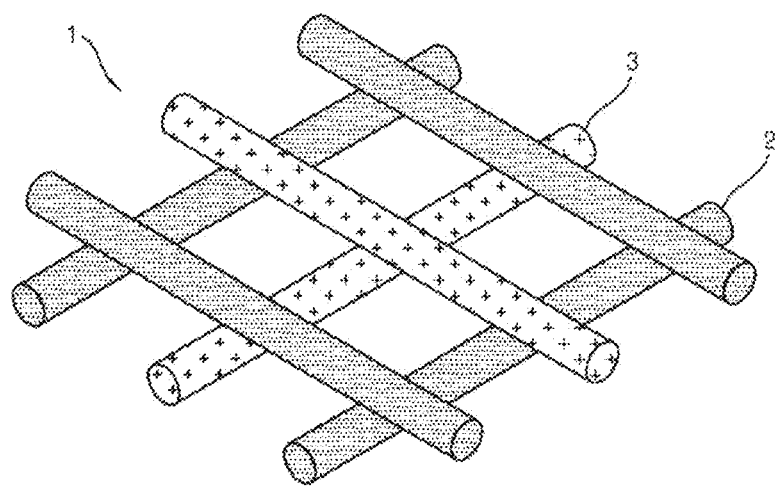
FIGS. 2 to 4 are perspective views illustrating hybrid scaffolds manufactured by a method of manufacturing a hybrid scaffold according to exemplary embodiments of the present inventive concept.
Figure 3:
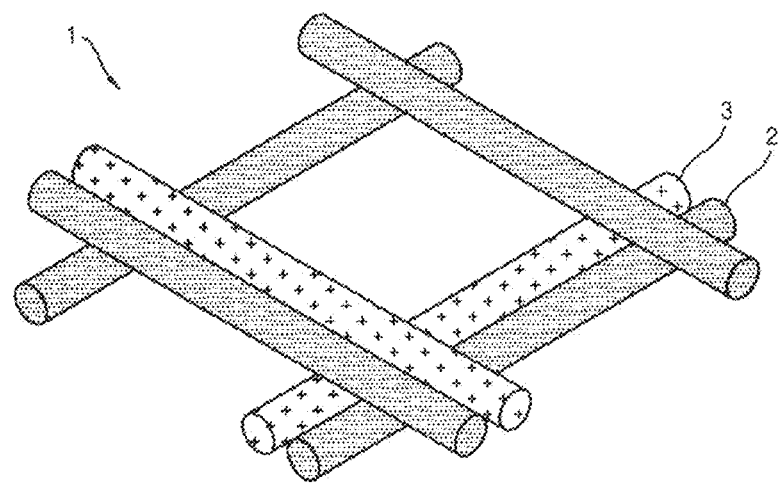
Figure 4:
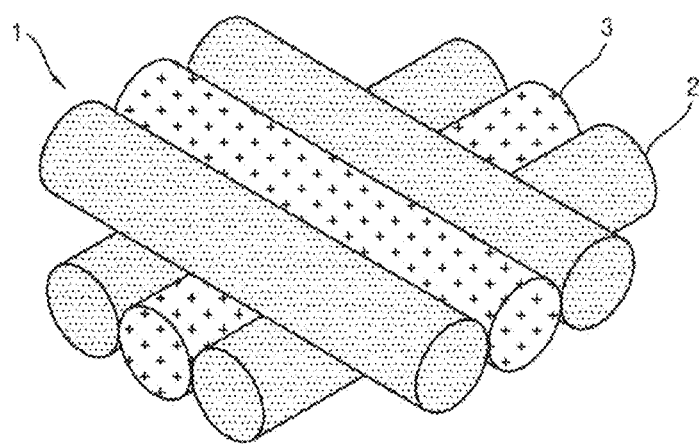

In example 1, a method of manufacturing a hybrid scaffold will be explained with reference to FIGS. 1 to 6. FIGS. 2 to 4 are perspective views illustrating hybrid scaffolds manufactured by a method of manufacturing a hybrid scaffold according to exemplary embodiments of the present inventive concept.

According to the present exemplary embodiment provides the method of manufacturing the hybrid scaffold 1, a first strand 2 including bio compatible polymer alternates with a second strand 3 including a mixture of bio compatible material and cells, so that mechanical strength is improved and the cells may be uniformly cultivated among an entire of the hybrid scaffold 1. Dispensing conditions for the bio compatible polymer and the bio compatible material having different characteristics from each other are controlled to manufacture the hybrid scaffold of a precise design.

Figure 1:
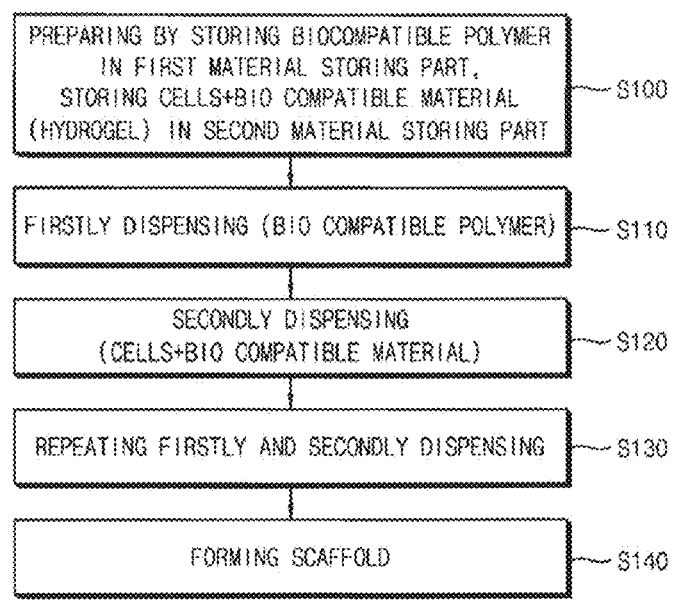
FIG. 1 is a flow chart illustrating a method of manufacturing a hybrid scaffold according to an exemplary embodiment of the present inventive concept.

FIG. 1 is a flow chart illustrating a method of manufacturing a hybrid scaffold according to an exemplary embodiment of the present inventive concept.

Referring to FIG. 1, the method of manufacturing the hybrid scaffold includes steps of preparing (step S100), firstly dispensing (step S110), secondly dispensing (step S120) and manufacturing the hybrid scaffold 1 (step S140). The first and second dispensing steps may be repeated (step S130).

In the method of manufacturing the hybrid scaffold, an apparatus 10 for manufacturing the hybrid scaffold includes a first dispensing head 101, a second dispensing head 102 and a collecting member 200. The first dispensing head 101 includes a first nozzle part 111 that disperses bio material supplied from a first material storing part 110. The second dispensing head 102 includes a second nozzle part 121 that disperses bio material supplied from a second material storing part 120. The collecting member 200 is disposed under the first dispensing head 101 and the second dispensing head 102.

The apparatus 10 for manufacturing the hybrid scaffold will be explained later. In the present inventive concept, the apparatus 10 for manufacturing the hybrid scaffold includes the first material storing part 110, the second material storing part 120, the first nozzle part 111 connected to the first material storing part 110 and the second nozzle part 121 connected to the second material storing part 120.

In the step of preparing, bio compatible polymer is filled in the first material storing part 110. Also, bio compatible material and cells are stored in the second material storing part 120 to be mixed with each other.

The bio compatible polymer and the bio compatible material may be solid state. The bio compatible polymer and the bio compatible material may be heated by a first heating part 131 mounted on the first material storing part 110 and a second heating part 132 mounted on the second material storing part 120 so that melted bio compatible polymer and bio compatible material may be dispersed through the first nozzle part 111 and the second nozzle part 121, respectively.

The first heating part 131 only heats the bio compatible polymer. However, the second heating part 132 heats the cells as well as the bio compatible material so that the temperature of the second heating part 132 may be about 36 degrees at which the cells may be cultivated well.

Examples of the bio compatible polymer may include poly-caprolactone (PCL), poly lactide (PLA), poly glycolide (PGA), poly lactide-co-glycolide (PLGA), polydioxanone (PDO), poly-L-lactic acid (PLLA), etc. Various bio compatible polymers may also be used.

Examples of the bio compatible material may include protein, hydrogel, etc. Examples of the protein that may be used for the bio compatible material may include collagen, gelatin, etc. Examples of the hydrogel that may be used for the bio compatible material may include Lutrol F127, Matrigel, Alginate, Methylcellulose, Agarose, Pura Matrix, Extracel, etc. Various bio compatible material may also be used. When Alginate is mixed with calcium chloride, Alginate may be quickly solidified.

In the step of the firstly dispensing, a dispensing position controller controls the first dispensing head 101. In the present exemplary embodiment, the dispensing position controller is designed to control the second dispensing head 102 as well as the first dispensing head 101. The melted bio compatible polymer is dispensed on the collecting member 200 to form the first strand 2 that is one strand of the hybrid scaffold 1.

In the step of the secondly dispensing, a dispensing position controller controls the second dispensing head 102. The bio compatible material and the cells are dispensed on the collecting member 200 to form the second strand 3 that is another strand of the hybrid scaffold 1.

The steps of the firstly and secondly dispensing may be alternated and repeated by a constant distance based on the shape of the hybrid scaffold 1.

Alternatively, sequence of the first dispensing and the secondly dispensing may be changed. For example, the second dispensing may be performed prior to the firstly dispensing. When a plurality of layers is stacked in Z direction, the first and second strands 2 and 3 may be alternated in every layer. Alternatively, the first and second strands 2 and 3 may be repeated in a same layer.

In the method of manufacturing the hybrid scaffold, the dispensing position controller controls the position of the first and second dispensing heads 101 and 102, so that the dispensing position of the bio compatible polymer and the bio compatible material and cells. A collecting position controller may control the position of the collecting member 200, so that the collecting position of the bio compatible polymer and the bio compatible material and cells.

In the step of manufacturing the hybrid scaffold 1, the first and second strands 2 and 3 are alternately disposed to form the hybrid scaffold 1. The first and second strands 2 and 3 may be arranged in various shapes. When a liquid of the mixture of the bio compatible material and the cells except the bio compatible polymer is solidified, the solidified bio compatible structure may have low mechanical strength. However, the hybrid scaffold 1 of the present invention is formed by hybrid type of the first strand 2, which is formed by dispensing the bio compatible polymer having higher strength that the bio compatible material, and the second strand 3, which is formed by dispensing the mixture of the bio compatible material and the cells. Thus, the strength of the hybrid scaffold 1 may be increased.

The bio compatible material has different viscosity from the bio compatible polymer at the time of dispensing. Thus, the first strand 2 may have different diameter from the second strand 3 although printing speed and printing pressure on the collecting member 200 are substantially the same.

For example, the bio compatible material and the bio compatible polymer may be printed on the collecting member 200 at the same printing pressure, the bio compatible material having lower viscosity and strength may be dispensed at a greater amount than the bio compatible polymer. Thus, the bio compatible material may be dispensed at a thicker thickness than the bio compatible polymer.

In the prior art, the design of the scaffold is restricted, because the dispensed amount of the bio compatible material and the bio compatible polymer may not be precisely controlled.

Thus, in order to manufacture the hybrid scaffold 1 including the hybrid of the first strand 2 having the bio compatible polymer and the second strand 3 having the mixture of the bio compatible material and the cells, the printing pressure and the printing speed of the first and second dispensing head 101 and 102 and the diameter of the first and second nozzle parts 111 and 121 are controlled based on a pore size and a diameter of each strand.

Thus, in the step of the preparing, proper diameters of the first and second nozzle parts 111 and 121 are selected based on the design condition of the hybrid scaffold 1, so that the first and second nozzle parts 111 and 121 having the proper diameters are mounted on the first and second dispensing heads 101 and 102. In the present exemplary embodiment, the diameters of the first and second nozzle parts 111 and 121 may be about 0.1 mm to about 0.5 mm.

In the step of the firstly dispensing, the printing speed of the bio compatible polymer on the collecting member 200 may be about 30 mm/min to about 600 mm/min. The printing pressure may be about 10 kPa to about 1,000 kPa.

In the step of the secondly dispensing, the printing speed of the mixture of the cells and the bio compatible material on the collecting member 200 may be about 30 mm/min to about 300 mm/min. The printing pressure may be about 10 kPa to about 400 kPa. The rotational frequency of a screw part may be about 1 rpm to about 100 rpm.

That is, in order to manufacture the first and second strands 2 and 3 having substantially the same diameters, the bio compatible polymer having greater viscosity and strength has greater pressure than the bio compatible material.

Thus, according to the method of manufacturing the hybrid scaffold of the present exemplary embodiment, the diameter of the first and second strands 2 and 3 and the interval between the first and second strands 2 and 3 may be precisely controlled. Thus, the hybrid scaffold 1 may be manufactured at the precise design.

That is, when the bio compatible polymer and the bio compatible material (hydrogel) having different strengths are dispersed, the printing speed and the printing pressure of the bio compatible polymer and the bio compatible material (hydrogel) are optimized, so that the size of the pores of the hybrid scaffold 1 may be controlled. Also, the hybrid scaffold 1 may be manufactured without any pore. Thus, the hybrid scaffold 1 may have various shapes, and the quality of the hybrid scaffold 1 such as the accuracy, the preciseness, etc., may be greatly improved.

Example 2

In example 2, the hybrid scaffold 1 manufactured by the method of manufacturing the hybrid scaffold of FIGS. 2 to 5 will be explained.

Referring to FIGS. 2 to 5, a first strand 2 and a second strand 3 are disposed in a hybrid arrangement to form the hybrid scaffold 1. The first strand 2 is formed by dispensing bio compatible polymer. The second strand 3 is formed by dispensing cells and bio compatible material. The first and second strands 2 and 3 may alternate by a constant interval in a same layer, or may alternate in every layer.

In the hybrid scaffold 1, the second strand 3 formed by dispensing the mixture of the cells and the bio compatible material is interposed in the hybrid scaffold 1, the cells are uniformly cultivated in an entire of the hybrid scaffold 1. Also, the first strand 2 compensates the mechanical strength of the second strand 3.

Referring again to FIG. 2, the first and second strands 2 and 3 alternate in the same layer to form the hybrid scaffold 1. The first and second strands 2 and 3 may be spaced apart from each other to form pores of a constant size between the first and second strands 2 and 3. When the pores are formed in the hybrid scaffold 1, nutrient may be easily infiltrated into the hybrid scaffold 1 through the pores and waste may be easily discharged from the hybrid scaffold 1 through the pores.

In FIG. 2, the first and second strands 2 and 3 extended in a vertical direction alternate in a horizontal direction in one layer, and the first and second strands 2 and 3 extended in the horizontal direction alternate in the vertical direction in an adjacent layer. Thus, the hybrid scaffold 1 includes the pores of the constant size.

Alternatively, referring again to FIG. 3, the first and second strands 2 and 3 may alternate in a same layer to form the hybrid scaffold 1, and a portion of the first and second strands 2 and 3 may make contact with each other in a width direction and another portion of the first and second strands 2 and 3 may be spaced apart from each other.

In FIG. 3, when viewed on a plane, one side of the first strand 2 may make contact with one side of the second strand 3, and another sides of the first and second strands 2 and 3 may be spaced apart from each other. Thus, the number of the pores formed in a same space may be about one quarter compared with the pores of FIG. 2.

Alternatively, referring to FIG. 4, the first and second strands 2 and 3 may alternate in a same layer to form the hybrid scaffold 1 without pores, and adjacent first and second strands 2 and 3 may make contact with each other, thereby removing pores to form a film shape.

That is, in FIG. 4, the first and second strands 2 and 3 may be alternately arranged without space, so that the first and second strands 2 and 3 may fill the pores.

Referring again to FIG. 4, the first and second strands 2 and 3 alternately arranged without space to form the film shape.

In the hybrid scaffold 1 of FIGS. 2 and 3, the first and second strands 2 and 3 include different materials having different viscosity and strength. Thus, in order to precisely control the interval between adjacent strands, the printing condition and the printing pressure of the bio compatible polymer may be different from the printing condition and the printing pressure of the cells and the bio compatible material.

The diameter of the first strand 2 of the hybrid scaffold 1 may be about 50 μm to about 1,000 μm. The diameter of the second strand 3 of the hybrid scaffold 1 may be about 100 μm to about 2,000 μm.

When the pores of FIGS. 2 and 3 are formed, an interval between the first and second strands 2 and 3 may be about 10 μm to about 500 μm.

In the hybrid scaffold 1 of FIG. 4, when the condition of the bio compatible polymer and the mixture of the cells and the hydrogel is not properly controlled, the second strand 3 having the hydrogel of low viscosity may cover adjacent first strand 2, or the second strand 3 may be too narrow. Thus, in order to control the cultivation condition of the cells, the dispensing condition is properly controlled.

Figure 5:
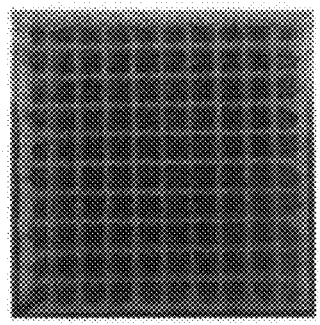
FIGS. 5A-5C are images illustrating the hybrid scaffolds of FIGS. 2 to 4.
Figure 5:
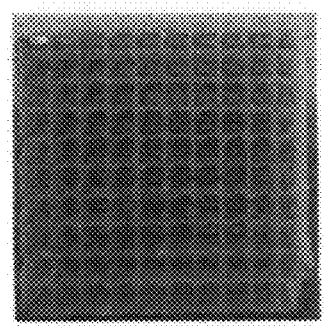
Figure 5:
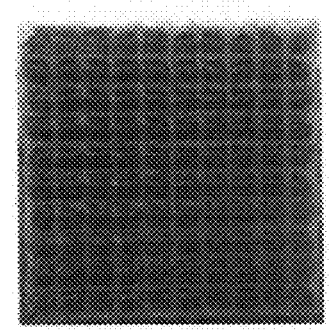

FIG. 5 is image illustrating the hybrid scaffolds of FIGS. 2 to 4. FIG. 5A corresponds to FIG. 2. FIG. 5B corresponds to FIG. 3. FIG. 5C corresponds to FIG. 4.

The hybrid scaffold 1 of the present invention may have wide variations.

Example 3

Figure 6:
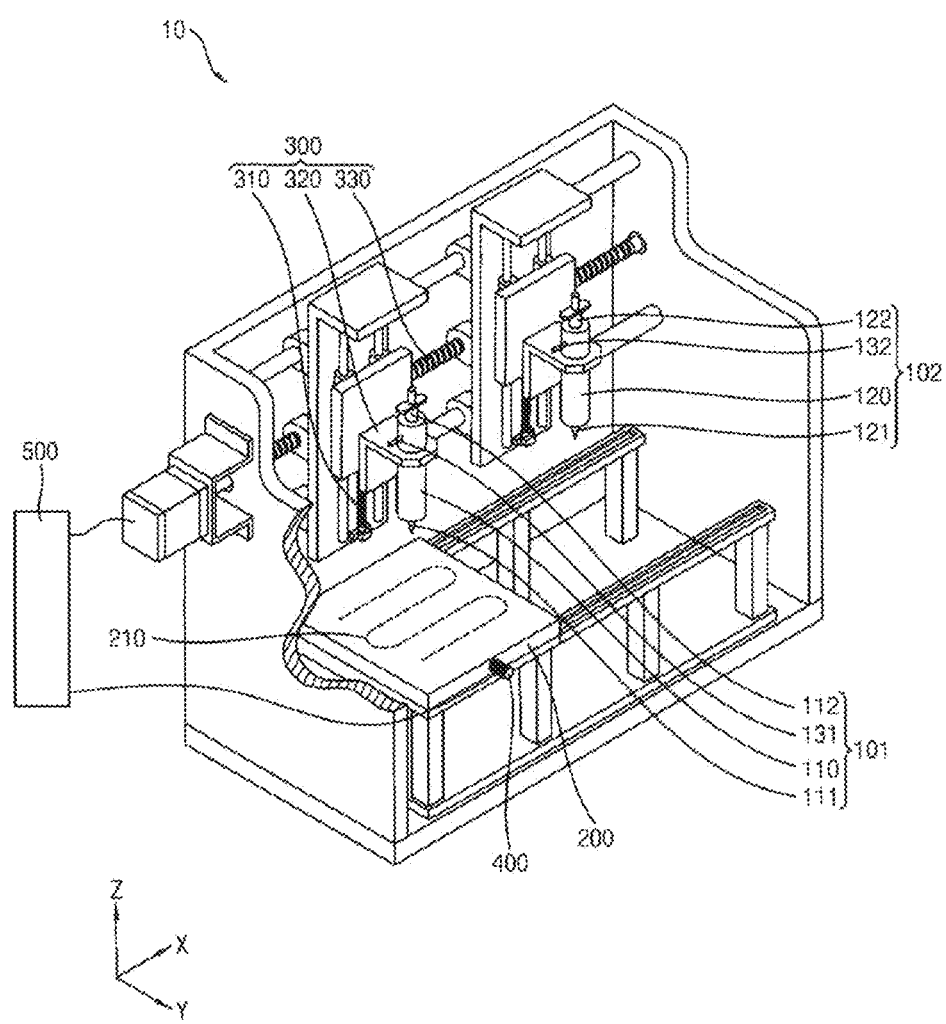
FIG. 6 is a perspective view illustrating an apparatus for manufacturing a hybrid scaffold according to an exemplary embodiment of the present inventive concept.

In Example 3, an apparatus for manufacturing a hybrid scaffold manufactured by the method of the present invention with reference to FIG. 6. FIG. 6 is a perspective view illustrating an apparatus for manufacturing a hybrid scaffold according to an exemplary embodiment of the present inventive concept.

Referring to FIG. 6, the apparatus 10 for manufacturing the hybrid scaffold includes a first dispensing head 101, a second dispensing head 102, a collecting member 200, a dispensing position controller 300, a collecting position controller 400 and a controlling member 500.

The first dispensing head 101 includes a first material storing part 110, a first nozzle part 111, a first piston 112 and a first heating part 131. Bio compatible polymer is stored in the first material storing part 110. The first nozzle part 111 dispenses bio material supplied from the first material storing part 110. The first piston 112 presses the bio material stored in the first material storing part 110 to be dispensed by the first nozzle part 111. The first heating part 131 heats the first material storing part 110.

The second dispensing head 102 includes a second material storing part 120, a second nozzle part 121, a second piston 122 and a second heating part 132. Mixture of bio compatible material (hydrogel) and cells is stored in the second material storing part 120. The second nozzle part 121 dispenses bio material supplied from the second material storing part 120. The second piston 122 presses the bio material stored in the second material storing part 120 to be dispensed by the second nozzle part 121. The second heating part 132 heats the second material storing part 120.

The first and second heating parts 131 and 132 may include heating coils that surround the first and second material storing parts 110 and 120, respectively. The first and second heating parts 131 and 132 heat the bio compatible polymer stored in the first material storing part 110 and the bio compatible material stored in the second material storing part 120, so that the bio compatible polymer stored in the first material storing part 110 and the bio compatible material stored in the second material storing part 120 are liquefied or melted.

When the bio compatible polymer stored in the first material storing part 110 is melted to be liquefied, the first dispensing head 101 operates the first piston 112 so that the liquefied bio compatible polymer is dispensed through the first nozzle part 111 toward the collecting member 200.

When the bio compatible material stored in the second material storing part 120 is melted to be liquefied, the second dispensing head 102 operates the second piston 122 so that the liquefied bio compatible material is dispensed through the second nozzle part 121 toward the collecting member 200.

The collecting member 200 has a plate shape. The collecting member 200 is disposed under the first and second dispensing heads 101 and 102 so that the material dispensed from the first and second nozzle part 111 and 121 may be collected by the collecting member 200.

The collecting member 200 may further include a collecting temperature controller 210. The collecting temperature controller 210 has a heating coil shape so that the temperature of the collecting member 200 may vary from room temperature to 100° C. The collecting temperature controller 210 may have various heating device.

The dispensing position controller 300 controls the position of the first and second dispensing heads 101 and 102 in at least one direction of X direction, Y direction and Z direction. The dispensing position controller 300 may include a fixing bracket 320 and an X direction guide rail 330. The fixing bracket 320 include a Z direction guide rail 310 that guides the first and second dispensing heads 101 and 102 in the Z direction. The X direction guide rail 330 guides the fixing bracket 320 in the X direction.

The collecting position controller 400 controls the position of the collecting member 200 in at least one direction of the X direction, the Y direction and the Z direction.

The dispensing position controller 300 and the collecting position controller 400 may control the position in two directions of the X direction, Y direction and Z direction. Alternatively, the dispensing position controller 300 and the collecting position controller 400 may control the position in one direction of the X direction, Y direction and Z direction.

However, when the dispensing position controller 300 and the collecting position controller 400 control the position in one direction of the X direction, Y direction and Z direction, the structure of the apparatus may be too complex. Thus, the arrangement of the directions in the dispensing position controller 300 and the collecting position controller 400 may be properly controlled.

The controlling member 500 controls the dispensing position controller 300 and the collecting position controller 400. The transporting speed and the transporting distance of the dispensing position controller 300 and the collecting position controller 400 are controlled by the controlling member 500. Also, the controlling member 500 may control various operation of the apparatus 10 for manufacturing the hybrid scaffold.

Figure 7:
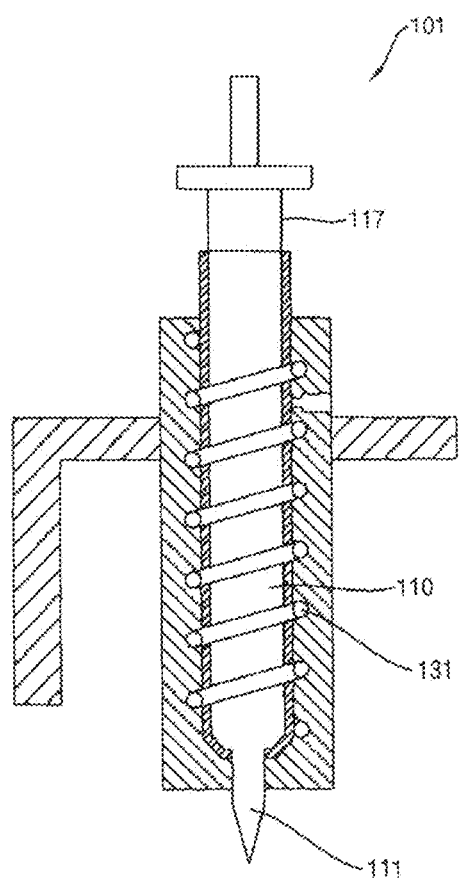
FIG. 7 is a cross-sectional view illustrating a first dispensing head of an apparatus for manufacturing a hybrid scaffold according to an exemplary embodiment of the present inventive concept.

FIG. 7 is a cross-sectional view illustrating a first dispensing head of an apparatus for manufacturing a hybrid scaffold according to an exemplary embodiment of the present inventive concept. Referring to FIG. 7, the first dispensing head 101 includes a first piston 112 and a first heating part 131. The first piston 112 presses the bio material stored in the first material storing part 110 so that the bio material may be dispensed through the first nozzle part 111. The first heating part 131 includes a heating coil surrounding an outer surface of the first material storing part 110 to melt the bio compatible polymer stored in the first material storing part 110.

When the bio compatible polymer stored in the first material storing part 110 is liquefied or melted by the first heating part 131, the first dispensing head 101 operates the first piston 112 so that the liquefied bio compatible polymer is dispensed to the collecting member 200 (shown in FIG. 6) through the first nozzle part 111.

Figure 8:
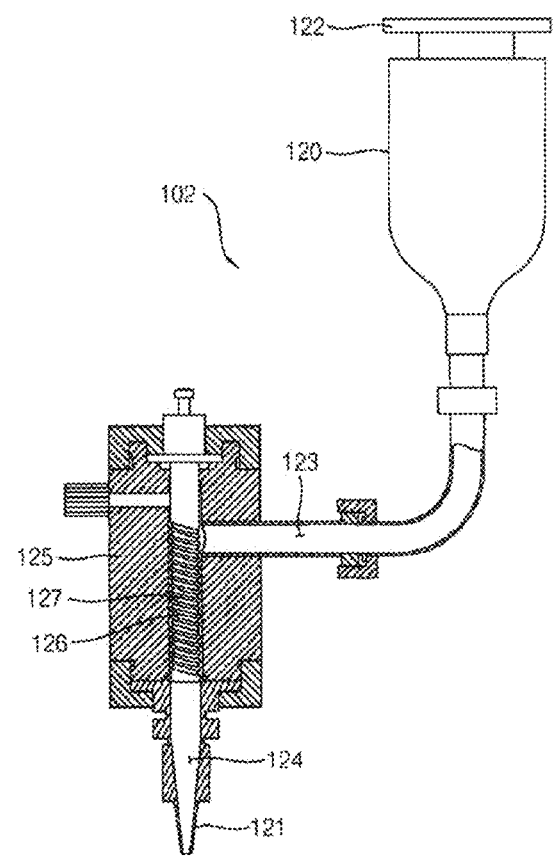
FIG. 8 is a cross-sectional view illustrating a second dispensing head according to an exemplary embodiment of the present inventive concept.

Alternatively, the second dispensing head of the apparatus 10 for manufacturing the hybrid scaffold may include a second piston 122, an external housing 125 and a screw part 127 as shown in FIG. 8.

FIG. 8 is a cross-sectional view illustrating a second dispensing head according to an exemplary embodiment of the present inventive concept. Referring to FIG. 8, the second dispensing head includes a second material storing part 120 and a second piston 122. The second piston 122 presses bio material stored in the second material storing part 120.

The second material storing part 120 may have a cylindrical shape. The second piston 122 has a piston shape, and is inserted into the second material storing part 120 to be downwardly pressed. Thus, the bio material stored in the second material storing part 120 is pressed outwardly.

The second piston 122 may be pressed by an air filled in an empty cylinder. That is, the bio material filled in the cylinder may be pressed by the air.

The external housing 125 may include an inlet 123 and an outlet 124. The bio material stored in the second material storing part 120 inflows through the inlet 123, and flows out through the outlet 124. The screw part 127 rotates in the external housing 125, and has a screw 126 connected between the inlet 123 and the outlet 124.

Referring again to FIG. 8, the bio material stored in the second material storing part 120 of the second dispensing head is pressed downwardly by the second piston 122. The pressed bio material inflows into the screw 126 of the screw part 127 through the inlet 123. The bio material liquid inflowed into the screw 126 flows out through the outlet 124 by the rotation of the screw part 127.

Therefore, the cells and the bio compatible material (hydrogel) are uniformly mixed and dispensed by the second dispensing head, so that the dispensing amount of the cells and bio compatible material (hydrogel) may be easily controlled.

Example 4

Figure 9:
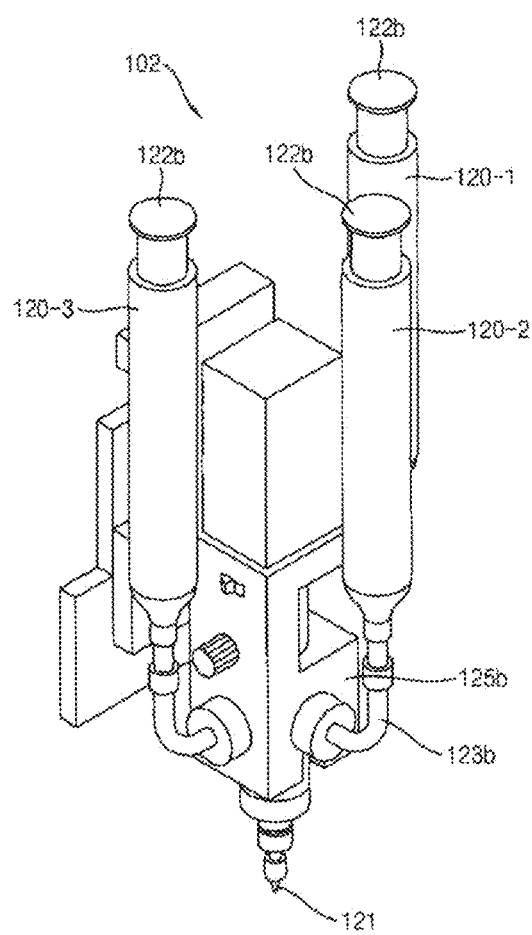
FIG. 9 is a perspective view illustrating a second dispensing head of an apparatus for manufacturing a hybrid scaffold according to an exemplary embodiment of the present inventive concept.

In example 4, an apparatus for manufacturing a hybrid scaffold according to an exemplary embodiment will be explained. The apparatus for manufacturing the hybrid scaffold of example 4 is substantially the same as shown in example 3 except a second dispensing head 102. Thus, any repetitive explanations concerning the same elements will be omitted. FIG. 9 is a perspective view illustrating a second dispensing head of an apparatus for manufacturing a hybrid scaffold according to an exemplary embodiment of the present inventive concept. The apparatus for manufacturing the hybrid scaffold may include a plurality of the second material storing parts 120 (shown in FIG. 8) of the second dispensing head 102.

The second material storing parts 120 (shown in FIG. 8) may be multiply disposed along an outer surface of a second external housing 125*b* (shown in FIG. 9). The number of the second material storing parts 120 (shown in FIG. 8) may be substantially the same as the number of inlets 123*b* formed at the second external housing 125*b* (shown in FIG. 9). When the second external housing 125*b* has enough space for the size of the inlets 123*b*, the number of the inlets 123*b* may be changed.

The second material storing part 120 (shown in FIG. 8) may include a 2-1 material storage 120-1 and a 2-2 material storage 120-2 (shown in FIG. 9). The 2-1 material storage 120-1 may include different bio material having different cells or solidifying agent from the 2-2 material storage 120-2.

The second material storing part 120 (shown in FIG. 8) may further include a 2-3 liquid storage 120-3 (shown in FIG. 9). The 2-3 material storage 120-3 may include solidifying agent or bio material having different cells from the 2-1 material storage 120-1 and the 2-2 material storage 120-2.

The hydrogel may include alginate, and the solidifying agent may include calcium chloride (CaCl2) solution. The alginate may be mixed with the cells at a room temperature, and may be quickly solidified when mixed with the calcium chloride (CaCl2) solution.

In the apparatus for manufacturing the hybrid scaffold, the solidifying agent may be stored in one of the material storages 120-1, 120-2 and 120-3 of the second material storing part 120, so that the solidifying agent may be dispersed on the collecting member 200 (shown in FIG. 6) on which the bio material for the hybrid scaffold is dispersed, thereby solidifying the material on the collecting member 200.

Therefore, in the apparatus for manufacturing the hybrid scaffold, the cells and the mixture of the bio compatible material are simultaneously dispersed, so that the cells may be interposed in the hybrid scaffold without seeding the cells in the hybrid scaffold.

Figure 10:
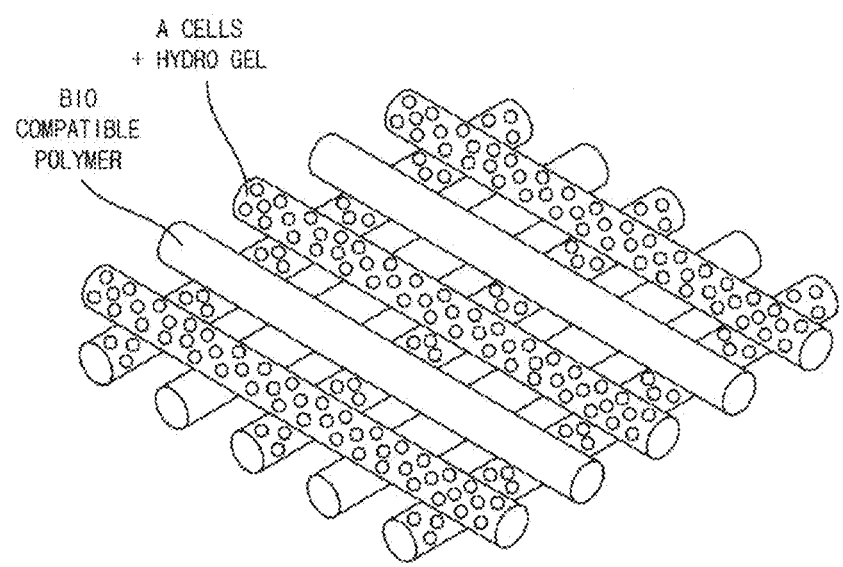
FIG. 10 is a perspective view illustrating a structure for cultivating cells manufactured by the method of manufacturing the hybrid scaffold according to an exemplary embodiment of the present inventive concept.

FIG. 10 is a perspective view illustrating a structure for cultivating cells manufactured by the method of manufacturing the hybrid scaffold according to an exemplary embodiment of the present inventive concept. That is, in the apparatus for manufacturing the hybrid scaffold, the cells and the bio compatible material (hydrogel) are mixed and dispersed to manufacture the hybrid scaffold. The cells may be uniformly cultivated in entire of the hybrid scaffold of FIG. 10 compared with a method of seeding cells after a scaffold is completed. In the present exemplary embodiment, the hybrid scaffold of FIG. 10 is substantially the same as shown in FIG. 2, and thus any repetitive explanations will be omitted.

Figure 11:
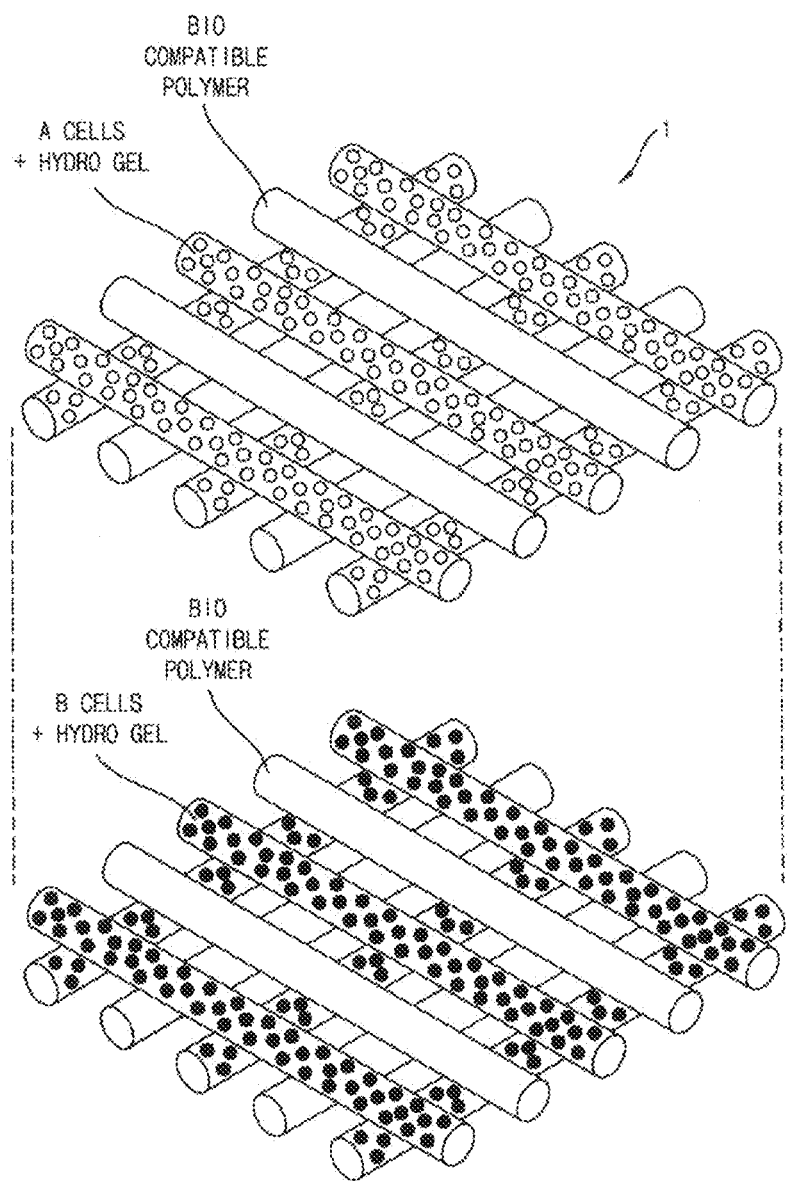
FIG. 11 is a perspective view illustrating a structure for cultivating cells manufactured by the method of manufacturing the hybrid scaffold according to an exemplary embodiment of the present inventive concept.

In FIG. 11, the hybrid scaffold includes four layers of upper 2 layers and lower 2 layers.

Also, when the hybrid scaffold includes a stacked structure of multi-layers of FIG. 11, the cells may be uniformly disposed along the multi-layers. Furthermore, different cells may be cultivated in different layers of the multi-layers. For example, in FIG. 11, the hybrid scaffold includes two layers, and the cells (for example, B cells) of a lower layer are different from the cells (for example, 'A' cells) of an upper layer.

Figure 12:
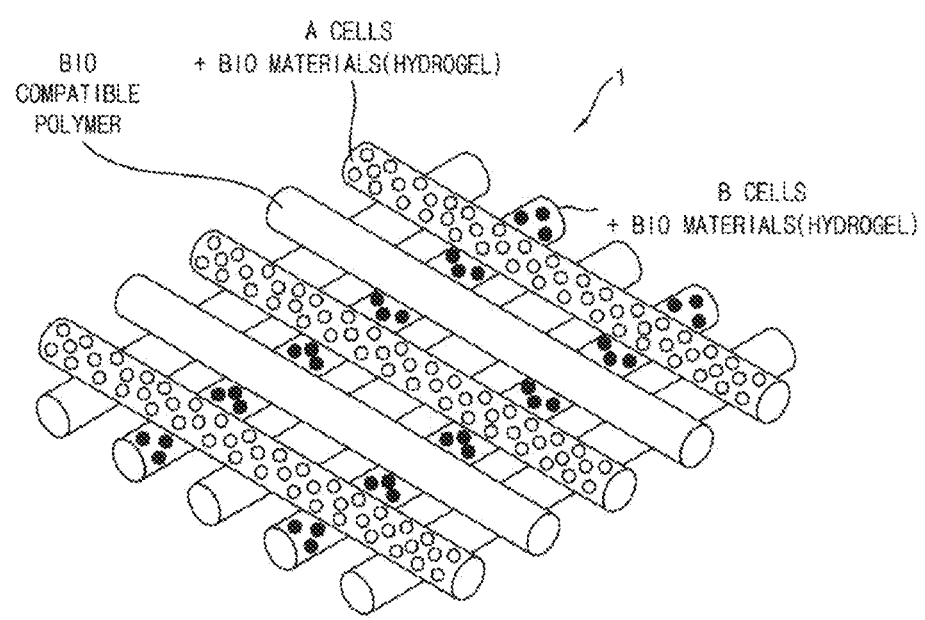
FIG. 12 is a perspective view illustrating a structure for cultivating cells manufactured by the method of manufacturing the hybrid scaffold according to an exemplary embodiment of the present inventive concept.

FIG. 12 is a perspective view illustrating a structure for cultivating cells manufactured by the method of manufacturing the hybrid scaffold according to an exemplary embodiment of the present inventive concept. In addition, in the apparatus for manufacturing the hybrid scaffold of the present exemplary embodiment, different cells may be cultivated in different regions of a single layered hybrid scaffold of FIG. 12.

The bio material stored in the material storages 120-1, 120-2 and 120-3 of the second material storing part of the second dispensing head 102 may flow into the screw part 127 (shown in FIG. 8). The inflowed bio material is mixed by the rotation of the screw part 127 (shown in FIG. 8). The mixed bio material is dispersed through the second nozzle part 121. Alternatively, the bio material stored in the material storages 120-1, 120-2 and 120-3 of the second material storing part of the second dispensing head 102 may individually inflow into the screw part 127 (shown in FIG. 8) through the second nozzle part 121 in sequence.

Therefore, when the apparatus for manufacturing the hybrid scaffold includes the material storages 120-1, 120-2 and 120-3 of the second material storing part, the bio material may be dispersed by mixing in the screw 126 (shown in FIG. 8) of the screw part 127 (shown in FIG. 8) to be simultaneously dispersed or be dispersed in sequence, thereby solidifying. Thus, various hybrid scaffold may be easily manufactured.

Therefore, in the hybrid scaffold manufactured by the apparatus for manufacturing the hybrid scaffold, the bio material including the hydrogel and the cells is stored in the second material storing part 120 (shown in FIG. 8) and the bio compatible polymer is stored in the first liquid storing part 110. The bio material including the hydrogel and the cells and the bio compatible polymer may be alternately dispensed, so that the cells may uniformly be cultivated in entire region of the hybrid scaffold.

Also, when a scaffold is manufactured only by the hydrogel and the cells (for example, the bio material stored in the second material storing part 120), mechanical strength of the scaffold may be low. In order to increase the mechanical strength, the apparatus for manufacturing the hybrid scaffold includes the first material storing part 101 (shown in FIG. 6) including the bio compatible polymer.

That is, when the scaffold only includes the hydrogel and the cells, the mechanical strength of the scaffold may be weak. However, in the present exemplary embodiment, the bio material including the bio compatible polymer having greater mechanical strength than the hydrogel is stored in the first material storing part 110, and the stored bio compatible polymer is dispensed through the first nozzle part 111. Thus, the mechanical strength of the entire hybrid scaffold may be increased.

FIG. 10 is a perspective view illustrating a structure for cultivating cells manufactured by the method of manufacturing the hybrid scaffold according to an exemplary embodiment of the present inventive concept. In FIG. 10, the hybrid scaffold includes a scaffold (a white portion without a spot) formed by the bio compatible polymer dispensed through the first nozzle part 111 (shown in FIG. 7) to increase mechanical strength and a scaffold (a portion with spots) formed by the liquid including the cells and the bio compatible material dispensed through the second nozzle part 121 (shown in FIG. 8).

Thus, when the hybrid scaffold is manufactured by the apparatus for manufacturing the hybrid scaffold, the bio material having the mixture of the cells and the bio compatible material is dispensed to form the hybrid scaffold, the cells may be uniformly seeded and cultivated in the entire of the hybrid scaffold. Also, when the hybrid scaffold has a stacked structure including a plurality of layers, the cells may be uniformly distributed in entire of the layers. In addition, different cells may also be cultivated in different layers.

In FIGS. 10 to 12, the bio material including the cells and the bio compatible material and the bio compatible polymer are dispensed through the first dispensing head 101 and the second dispensing head 102, respectively, to increase the mechanical strength of the hybrid scaffold 1.

The foregoing is illustrative of the present teachings and is not to be construed as limiting thereof. Although a few exemplary embodiments have been described, those skilled in the art will readily appreciate from the foregoing that many modifications are possible in the exemplary embodiments without materially departing from the novel teachings and advantages of the present disclosure of invention. Accordingly, all such modifications are intended to be included within the scope of the present teachings. In the claims, means-plus-function clauses are intended to cover the structures described herein as performing the recited function and not only structural equivalents but also functionally equivalent structures.

What is claimed is:

1. A method for manufacturing a hybrid scaffold, by using:
   a first dispensing head including a first nozzle part dispensing first bio material supplied from a first material storing part,
   a second dispensing head including a second nozzle part dispensing second bio material supplied from a second material storing part, and
   a collecting member disposed under the first and second dispensing heads,
   the method comprising:
   a) preparing by
      storing the first bio material being bio compatible polymer in the first material storing part, and
      storing the second bio material being a mixture of bio compatible material and cells in the second material storing part;
   b) firstly dispensing by controlling a position of the first dispensing head using a dispensing position controller to dispense liquefied or melted said bio compatible polymer on the collecting member, to form a first strand;
   c) secondly dispensing by controlling a position of the second dispensing head using the dispensing position controller to dispense the mixture of the bio compatible material and the cells on the collecting member, to form a second strand; and
   d) forming the hybrid scaffold by alternately disposing the first and second strands,
   wherein the bio compatible polymer is one selected from the group consisting of poly-caprolactone (PCL), poly lactide (PLA), poly glycolide (PGA), poly lactide-co-glycolide (PLGA), polydioxanone (PDO) and poly-L-lactic acid (PLLA),
   wherein the bio compatible material is one selected from the group consisting of protein and hydrogel,
   wherein the first dispensing head further comprises a first piston and a first heating part,
   the first piston pressing the first bio material stored in the first material storing part so that the first bio material is dispensed through the first nozzle part, and
   the first heating part including a heating coil around an external surface of the first material storing part, the heating coil liquefying or melting the bio compatible polymer stored in the first material storing part, the liquefied bio compatible polymer being dispensed through first nozzle part,
   wherein printing pressures and printing speeds of the first and second dispensing heads and diameters of the first and second nozzle parts are controlled based on a size of pores in the hybrid scaffold and a diameter of each of the first and second strands, wherein the second dispensing head further comprises a second piston, an external housing and a screw part, the second piston pressing the second bio material stored in the second material storing part, the external housing including an inlet and an outlet, the second bio material stored in the second material storing part flowing in through the inlet, the second bio material flowing out through the outlet, the screw part rotationally mounted in the external housing, the screw part including a screw connected between the inlet and the outlet, and the second nozzle part connected to the outlet, the second bio material being dispensed through the second nozzle part, wherein a rotational frequency of the screw part, through which the mixture of the bio compatible material and the cells is dispensed on the collecting member in the secondly dispensing, is about 1 rpm to about 100 rpm.

2. The method of claim 1, wherein the preparing further comprises selecting the diameters of the first and second nozzle parts based on the size of the pores in the hybrid scaffold and a size of each of the first and second strands.

3. The method of claim 1, wherein the firstly dispensing further comprises dispensing the bio compatible polymer to be printed at the printing speed of about 30 mm/min to about 600 mm/min and the printing pressure of about 10 kPa to about 1,000 kPa.

4. The method of claim 1, wherein the secondly dispensing further comprises dispensing the mixture of the bio compatible material and the cells to be printed at the printing speed of about 30 mm/min to about 300 mm/min and the printing pressure of about 10 kPa to about 400 kPa.

5. The method of claim 1, wherein the second material storing part comprises a plurality of material storages.

6. The method of claim 5, wherein the second material storing part comprises:
   a first material storage; and
   a second material storage.

7. The method of claim 6, wherein the second material storing part further comprises:
   a third material storage including a solidifying agent or a bio material having cells different from the first material storage or the second material storage.

* * * * *